United States Patent
Xiong et al.

(10) Patent No.: US 12,198,247 B2
(45) Date of Patent: Jan. 14, 2025

(54) SYSTEM AND METHOD FOR GENERATING A THREE-DIMENSIONAL PHOTOGRAPHIC IMAGE

(71) Applicant: Samsung Electronics Co., Ltd., Suwon-si (KR)

(72) Inventors: Yingen Xiong, Mountain View, CA (US); Christopher Peri, Mountain View, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 35 days.

(21) Appl. No.: 17/806,029

(22) Filed: Jun. 8, 2022

(65) Prior Publication Data

US 2023/0245373 A1  Aug. 3, 2023

Related U.S. Application Data

(60) Provisional application No. 63/304,464, filed on Jan. 28, 2022.

(51) Int. Cl.
*G06T 15/00* (2011.01)
*G06T 7/50* (2017.01)
(Continued)

(52) U.S. Cl.
CPC .............. *G06T 15/005* (2013.01); *G06T 7/50* (2017.01); *H04N 13/128* (2018.05); *H04N 13/225* (2018.05)

(58) Field of Classification Search
None
See application file for complete search history.

(56) References Cited

U.S. PATENT DOCUMENTS

| | | |
|---|---|---|
| 8,890,868 B2 | 11/2014 | Barenburg et al. |
| 9,210,405 B2 | 12/2015 | Levy |

(Continued)

FOREIGN PATENT DOCUMENTS

| | | |
|---|---|---|
| EP | 2962290 B1 | 7/2019 |
| KR | 101873759 B1 | 8/2018 |

(Continued)

OTHER PUBLICATIONS

International Search Report and Written Opinion of the International Searching Authority dated Apr. 24, 2023 in connection with International Patent Application No. PCT/KR2023/001064, 7 pages.

(Continued)

*Primary Examiner* — Sultana M Zalalee

(57) ABSTRACT

A method includes receiving, from a camera, one or more frames of image data of a scene comprising a background and one or more three-dimensional objects, wherein each frame comprises a raster of pixels of image data; detecting layer information of the scene, wherein the layer information is associated with a depth-based distribution of the pixels in the one or more frames; and determining a multi-layer model for the scene, the multi-layer model comprising a plurality of discrete layers comprising first and second discrete layers, wherein each discrete layer is associated with a unique depth value relative to the camera. The method further includes mapping the pixels to the layers of the plurality of discrete layers; rendering the pixels as a first image of the scene as viewed from a first perspective; and rendering the pixels as a second image of the scene as viewed from a second perspective.

20 Claims, 9 Drawing Sheets

(51) Int. Cl.
*H04N 13/128* (2018.01)
*H04N 13/225* (2018.01)

(56) References Cited

U.S. PATENT DOCUMENTS

| | | | |
|---|---|---|---|
| 9,247,228 B2 | 1/2016 | Malik | |
| 9,707,720 B2* | 7/2017 | Chen | B29C 64/393 |
| 10,748,329 B2 | 8/2020 | Li | |
| 11,037,362 B2 | 6/2021 | Shin et al. | |
| 11,551,417 B2* | 1/2023 | Selden | G06T 17/10 |
| 2008/0095436 A1* | 4/2008 | Kim | G06V 10/28 |
| | | | 382/173 |
| 2011/0074778 A1* | 3/2011 | Turner | H04N 13/122 |
| | | | 345/420 |
| 2011/0157155 A1 | 6/2011 | Turner et al. | |
| 2011/0193863 A1* | 8/2011 | Gremse | H04N 13/351 |
| | | | 345/419 |
| 2012/0293615 A1* | 11/2012 | Chen | G06T 15/205 |
| | | | 382/167 |
| 2013/0027391 A1* | 1/2013 | Lin | G06T 15/00 |
| | | | 345/419 |
| 2013/0268882 A1 | 10/2013 | Roh et al. | |
| 2014/0092221 A1* | 4/2014 | Nagai | H04N 13/261 |
| | | | 348/51 |
| 2015/0104101 A1* | 4/2015 | Bryant | G06T 7/557 |
| | | | 382/171 |
| 2015/0208054 A1* | 7/2015 | Michot | H04N 13/128 |
| | | | 348/54 |
| 2015/0243324 A1* | 8/2015 | Sandrew | H04N 13/266 |
| | | | 386/278 |
| 2015/0341616 A1* | 11/2015 | Siegel | H04N 13/111 |
| | | | 348/54 |
| 2015/0358612 A1* | 12/2015 | Sandrew | H04N 13/261 |
| | | | 348/47 |
| 2017/0085863 A1* | 3/2017 | Lopez | H04N 13/261 |
| 2017/0127048 A1* | 5/2017 | Nobayashi | H04N 13/128 |
| 2019/0389243 A1 | 12/2019 | Taylor et al. | |
| 2020/0388077 A1* | 12/2020 | Ninan | G06T 19/006 |
| 2021/0342973 A1 | 11/2021 | Jung et al. | |
| 2022/0254126 A1 | 8/2022 | Ninan et al. | |
| 2023/0085080 A1* | 3/2023 | Yamamoto | H04N 23/61 |
| | | | 348/222.1 |

FOREIGN PATENT DOCUMENTS

| | | |
|---|---|---|
| KR | 101967751 B1 | 4/2019 |
| KR | 102279143 B1 | 7/2021 |
| KR | 20210133457 A | 11/2021 |

OTHER PUBLICATIONS

Chen et al., "Stratified Labeling for Surface Consistent Parallax Correction and Occlusion Completion," arXiv:1903.02688v2 [cs.CV], Mar. 2019, 12 pages.

Supplementary European Search Report dated Nov. 12, 2024 in connection with European Patent Application No. 23747282.4, 9 pages.

Liu et al., "Layered Representation of Scenes Based on Multiview Image Analysis," IEEE Transactions on Circuits and Systems for Video Technology, vol. 10, No. 4, Jun. 2000, 12 pages.

* cited by examiner

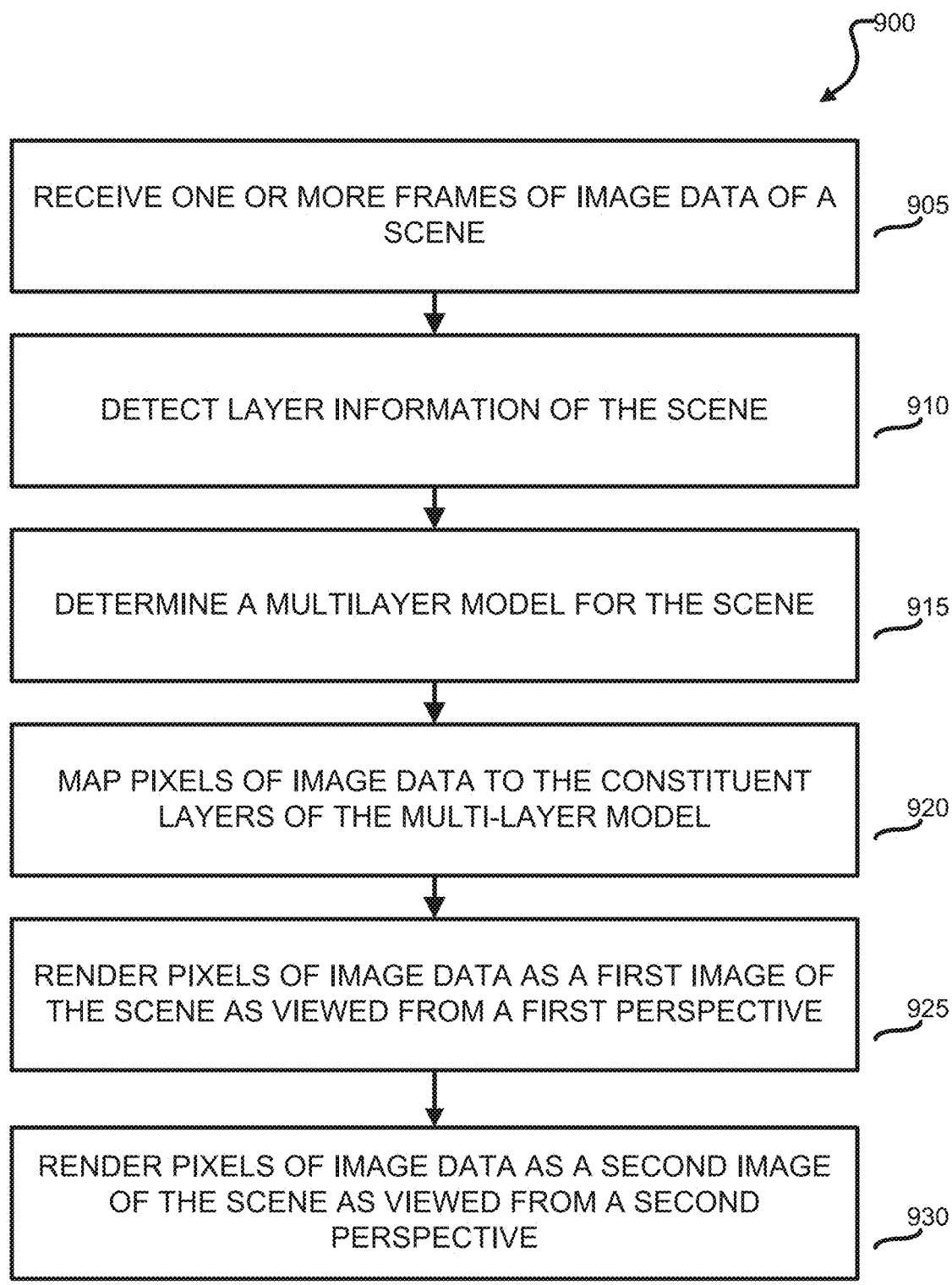

SYSTEM AND METHOD FOR GENERATING A THREE-DIMENSIONAL PHOTOGRAPHIC IMAGE

CROSS-REFERENCE TO RELATED APPLICATION AND CLAIM OF PRIORITY

This application claims priority under 35 U.S.C. § 119 (e) to U.S. Provisional Patent Application No. 63/304,464 filed on Jan. 28, 2022. The above-identified provisional patent application is hereby incorporated by reference in its entirety.

TECHNICAL FIELD

This disclosure relates to digital imaging and depth-based projection and reprojection of digital images. More specifically, this disclosure relates to a system and method for creating a three-dimensional photographic image.

BACKGROUND

Smartphones, tablets and other readily portable, battery-powered devices which combine sensors for tracking one or more of the device's motion or a user's position relative to the device have become the dominant computing platform for many users. The integration of processing power and motion and visual sensors in a compact, battery powered apparatus presents new and exciting opportunities for extending the functionality of smartphones and tablets-including, without limitation, motion or viewpoint-adjusted projection of two-dimensional images to create the illusion of depth and three-dimensionality. However, extending the functionality of such computing devices to include real-time reprojection of two-dimensional images to appear three-dimensional (for example, by selectively occluding pixels in response to changes in viewing angle to create the appearance of physical depth) presents new, as-yet unsolved technical challenges. These challenges include, without limitation, generating perspective-based reprojections in a way that conserves portable apparatus' limited battery and processing resources.

Accordingly, providing effective, generating three-dimensional projections of one or more two-dimensional source images in a computationally efficient manner remains a source of technical challenges and opportunities for improvement in the art.

SUMMARY

This disclosure provides a system and method for three-dimensional photographic images.

In a first embodiment, a method of generating a two-dimensional image with parallax shift effects providing an appearance of three-dimensional depth, includes receiving, from a camera, one or more frames of image data of a scene comprising a background and one or more three-dimensional objects, wherein each frame of image data comprises a raster of pixels of image data; detecting, based on the one or more frames of image data, layer information of the scene, wherein the layer information is associated with a depth-based distribution of the pixels of image data in the one or more frames of image data; and determining, based on the layer information of the scene, a multi-layer model for the scene, the multi-layer model comprising a plurality of discrete layers comprising a first discrete layer and a second discrete layer, wherein each discrete layer is associated with a unique depth value relative to the camera. The method further includes mapping the pixels of image data to the layers of the plurality of discrete layers; rendering the pixels of image data as a first image of the scene as viewed from a first perspective; and rendering the pixels of image data as a second image of the scene as viewed from a second perspective; wherein one or more pixels of the first discrete layer occlude a first set of pixels of the second discrete layer in the first image; and wherein the one or more pixels of the first discrete layer occlude a second set of pixels of the second discrete layer in the second image.

In a second embodiment, an apparatus for generating a two-dimensional image with parallax shift effects providing an appearance of three-dimensional depth includes a camera and a controller. The controller is configured to receive, from the camera, one or more frames of image data of a scene comprising a background and one or more three-dimensional objects, wherein each frame of image data comprises a raster of pixels of image data; detect, based on the one or more frames of image data, layer information of the scene, wherein the layer information is associated with a depth-based distribution of the pixels of image data in the one or more frames of image data; determine, based on the layer information of the scene, a multi-layer model for the scene, the multi-layer model comprising a plurality of discrete layers comprising a first discrete layer and a second discrete layer, wherein each discrete layer is associated with a unique depth value relative to the camera; map the pixels of image data to the layers of the plurality of discrete layers; render the pixels of image data as a first image of the scene as viewed from a first perspective; and render the pixels of image data as a second image of the scene as viewed from a second perspective; wherein one or more pixels of the first discrete layer occlude a first set of pixels of the second discrete layer in the first image; and wherein the one or more pixels of the first discrete layer occlude a second set of pixels of the second discrete layer in the second image.

In a third embodiment, a non-transitory computer-readable medium includes instructions that, when executed by a processor, cause an apparatus to receive, from a camera, one or more frames of image data of a scene comprising a background and one or more three-dimensional objects, wherein each frame of image data comprises a raster of pixels of image data; detect, based on the one or more frames of image data, layer information of the scene, wherein the layer information is associated with a depth-based distribution of the pixels of image data in the one or more frames of image data; determine, based on the layer information of the scene, a multi-layer model for the scene, the multi-layer model comprising a plurality of discrete layers comprising a first discrete layer and a second discrete layer, wherein each discrete layer is associated with a unique depth value relative to the camera; map the pixels of image data to the layers of the plurality of discrete layers; render the pixels of image data as a first image of the scene as viewed from a first perspective; and render the pixels of image data as a second image of the scene as viewed from a second perspective: wherein one or more pixels of the first discrete layer occlude a first set of pixels of the second discrete layer in the first image; and wherein the one or more pixels of the first discrete layer occlude a second set of pixels of the second discrete layer in the second image.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory, random access memory, a hard disk drive, a compact disc, a digital video disc, or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of this disclosure and its advantages, reference is now made to the following description, taken in conjunction with the accompanying drawings, in which:

FIG. 9 illustrates operations of an example method for generating a three-dimensional photographic image according to certain embodiments of this disclosure.

DETAILED DESCRIPTION

FIGS. 1 through 9, discussed below, and the various embodiments used to describe the principles of this disclosure in this patent document are by way of illustration only and should not be construed in any way to limit the scope of the disclosure. Those skilled in the art will understand that the principles of this disclosure may be implemented in any suitably arranged wireless communication system.

Figure 1:
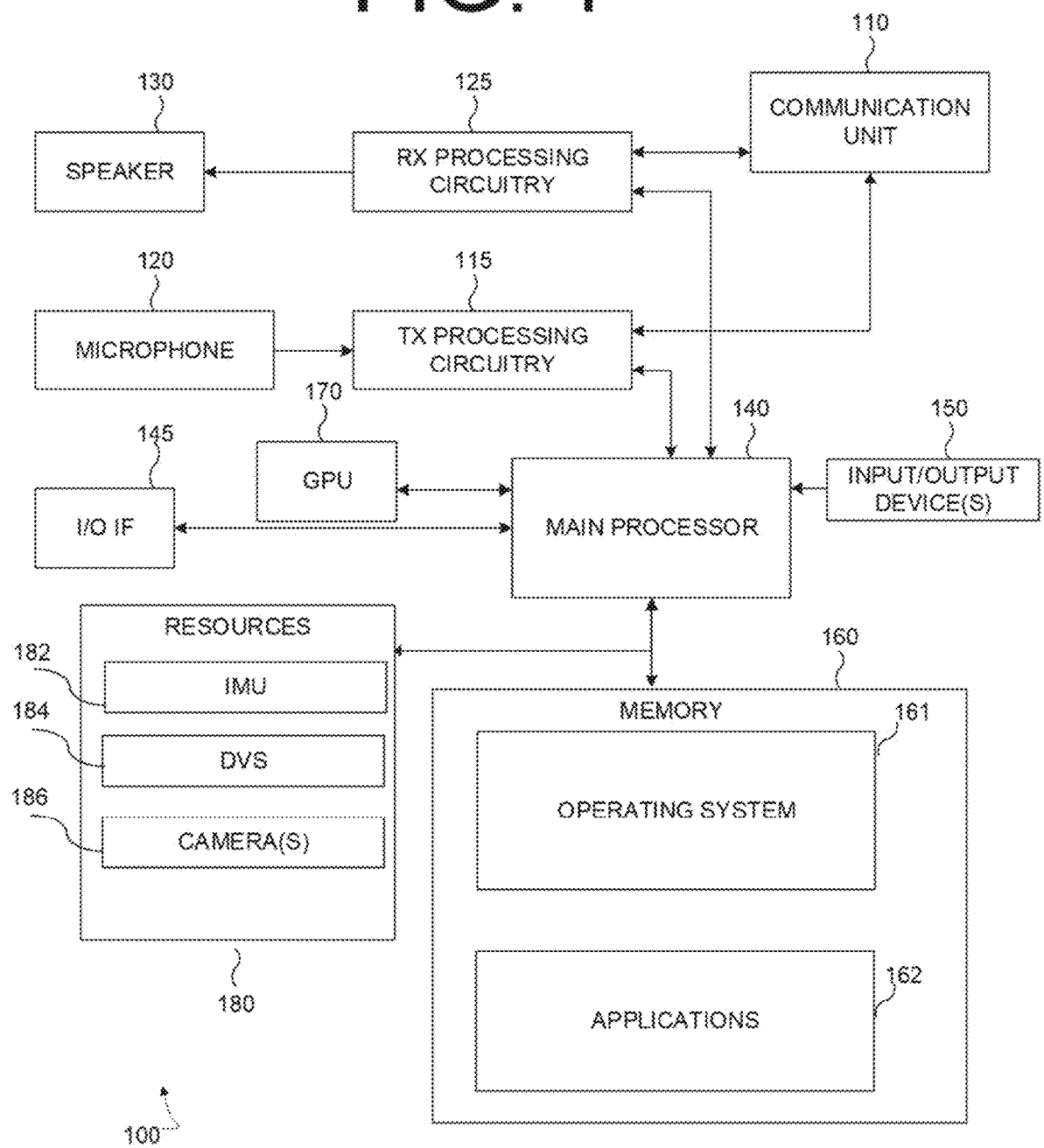
FIG. 1 illustrates an example of an electronic device generating a three-dimensional photographic image according to certain embodiments of this disclosure.

FIG. 1 illustrates a non-limiting example of a device 100 for generating a three-dimensional photographic image according to some embodiments of this disclosure. The embodiment of the device 100 shown in FIG. 1 is for illustration only, and other configurations are possible. However, suitable devices come in a wide variety of configurations, and FIG. 1 does not limit the scope of this disclosure to any particular implementation of a device. For example, device 100 may be implemented as an HMD, or as a separate device (for example, a smartphone) controlling an AR display presented at a connected (for example, through a BLUETOOTH or ZIGBEE connection) HMD.

As shown in the non-limiting example of FIG. 1, the device 100 includes a communication unit 110 that may include, for example, a radio frequency (RF) transceiver, a BLUETOOTH transceiver, or a WI-FI transceiver, etc., transmit (TX) processing circuitry 115, a microphone 120, and receive (RX) processing circuitry 125. The device 100 also includes a speaker 130, a main processor 140, an input/output (I/O) interface (IF) 145, input/output device(s) 150, and a memory 160. The memory 160 includes an operating system (OS) program 161 and one or more applications 162.

Applications 162 can include games, social media applications, applications for geotagging photographs and other items of digital content, virtual reality (VR) applications, augmented reality (AR) applications, operating systems, device security (e.g., anti-theft and device tracking) applications or any other applications which access resources of device 100, the resources of device 100 including, without limitation, speaker 130, microphone 120, input/output devices 150, and additional resources 180. According to some embodiments, applications 162 include applications which can project, on the display, an image that presents perspective based changes that provide the appearance of three-dimensional depth.

The communication unit 110 may receive an incoming RF signal, for example, a near field communication signal such as a BLUETOOTH or WI-FI signal. The communication unit 110 can down-convert the incoming RF signal to generate an intermediate frequency (IF) or baseband signal. The IF or baseband signal is sent to the RX processing circuitry 125, which generates a processed baseband signal by filtering, decoding, or digitizing the baseband or IF signal. The RX processing circuitry 125 transmits the processed baseband signal to the speaker 130 (such as for voice data) or to the main processor 140 for further processing (such as for web browsing data, online gameplay data, notification data, or other message data). Additionally, communication unit 110 may contain a network interface, such as a network card, or a network interface implemented through software.

The TX processing circuitry 115 receives analog or digital voice data from the microphone 120 or other outgoing baseband data (such as web data, e-mail, or interactive video game data) from the main processor 140. The TX processing circuitry 115 encodes, multiplexes, or digitizes the outgoing baseband data to generate a processed baseband or IF signal. The communication unit 110 receives the outgoing processed baseband or IF signal from the TX processing circuitry 115 and up-converts the baseband or IF signal to an RF signal for transmission.

The main processor 140 can include one or more processors or other processing devices and execute the OS program 161 stored in the memory 160 in order to control the overall operation of the device 100. For example, the main processor 140 could control the reception of forward channel signals and the transmission of reverse channel signals by the communication unit 110, the RX processing circuitry 125, and the TX processing circuitry 115 in accordance with well-known principles. In some embodiments, the main processor 140 includes at least one microprocessor or microcontroller.

The main processor 140 is also capable of executing other processes and programs resident in the memory 160. The main processor 140 can move data into or out of the memory 160 as required by an executing process. In some embodiments, the main processor 140 is configured to execute the applications 162 based on the OS program 161 or in response to inputs from a user or applications 162. Applications 162 can include applications specifically developed for the platform of device 100, or legacy applications developed for earlier platforms. Additionally, main processor 140 can be manufactured to include program logic for implementing methods for monitoring suspicious application access according to certain embodiments of the present disclosure. The main processor 140 is also coupled to the I/O interface 145, which provides the device 100 with the ability to connect to other devices such as laptop computers and handheld computers. The I/O interface 145 is the communication path between these accessories and the main processor 140.

The main processor 140 is also coupled to the input/output device(s) 150. The operator of the device 100 can use the input/output device(s) 150 to enter data into the device 100. Input/output device(s) 150 can include keyboards, head mounted displays (HMD), touch screens, mouse(s), track balls or other devices capable of acting as a user interface to allow a user to interact with electronic device 100. In some embodiments, input/output device(s) 150 can include a touch panel, a (digital) pen sensor, a key, or an ultrasonic input device.

Input/output device(s) 150 can include one or more screens, which can be a liquid crystal display, light-emitting diode (LED) display, an optical LED (OLED), an active-matrix OLED (AMOLED), or other screens capable of rendering graphics.

The memory 160 is coupled to the main processor 140. According to certain embodiments, part of the memory 160 includes a random access memory (RAM), and another part of the memory 160 includes a Flash memory or other read-only memory (ROM). Although FIG. 1 illustrates one example of a device 100. Various changes can be made to FIG. 1.

For example, according to certain embodiments, device 100 can further include a separate graphics processing unit (GPU) 170.

According to certain embodiments, electronic device 100 includes a variety of additional resources 180 which can, if permitted, be accessed by applications 162. According to certain embodiments, additional resources 180 include an accelerometer or inertial motion unit 182, which can detect movements of the electronic device along one or more degrees of freedom. Additional resources 180 include, in some embodiments, a dynamic vision sensor (DVS) 184, one or more cameras 186 of electronic device 100.

Although FIG. 1 illustrates one example of a device 100 for generating a three-dimensional photographic image, various changes may be made to FIG. 1. For example, the device 100 could include any number of components in any suitable arrangement. In general, devices including computing and communication systems come in a wide variety of configurations, and FIG. 1 does not limit the scope of this disclosure to any particular configuration. While FIG. 1 illustrates one operational environment in which various features disclosed in this patent document can be used, these features could be used in any other suitable system.

Figure 2:
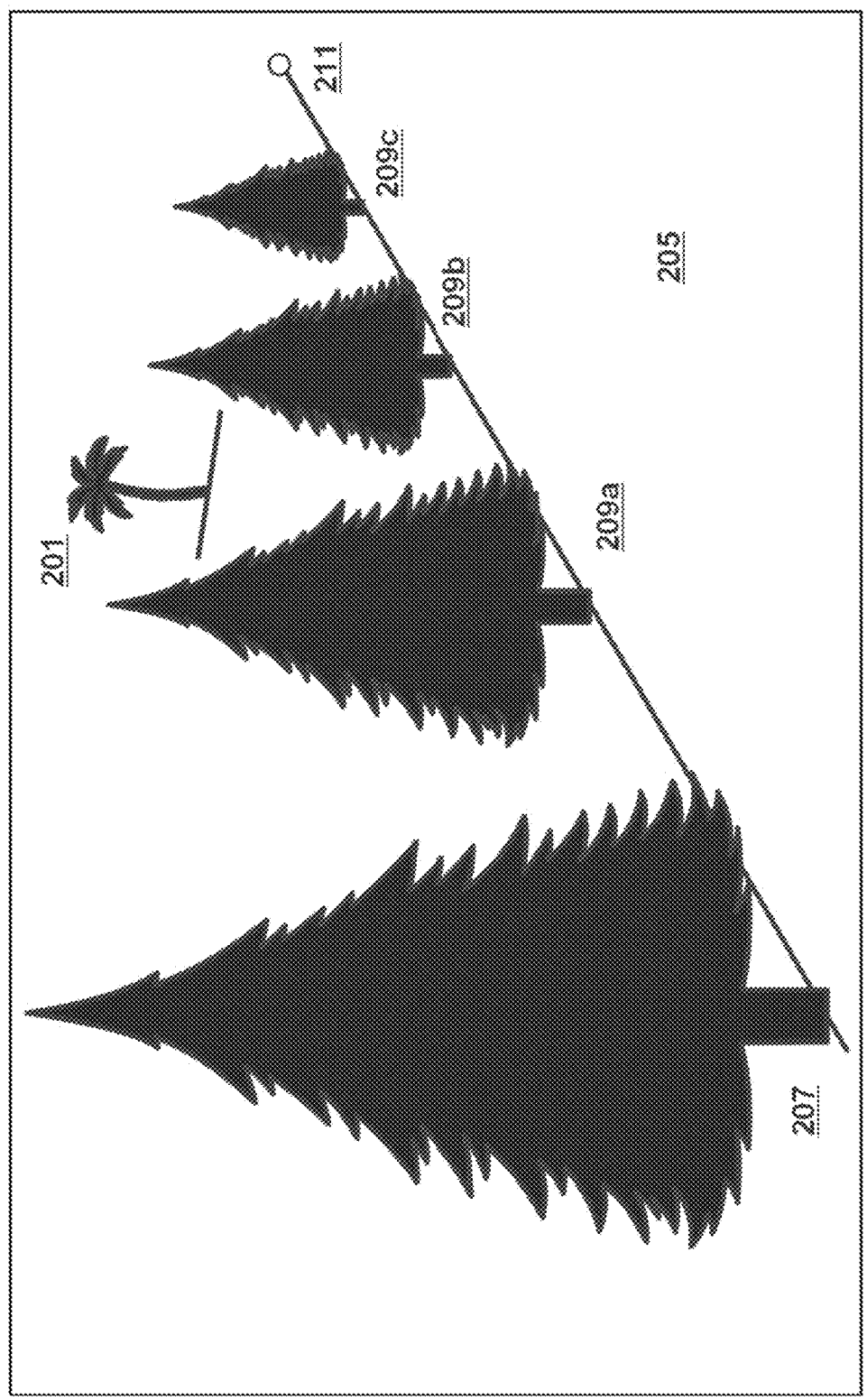
FIG. 2 illustrates an example of a scene according to certain embodiments of this disclosure.

FIG. 2 illustrates an example of a two-dimensional image with parallax shift effects that provide the appearance of three-dimensional depth provided by certain embodiments according to this disclosure.

Referring to the illustrative example of FIG. 2, a two-dimensional image of a scene 200, as seen from a first vantage point is shown in the figure. The objects in scene 200 comprise a background 201, a foreground field 205 defining a ground plane, a first tree 207 positioned in the foreground, and second, third and fourth trees 209a-209c at progressively greater distances away from the first vantage point.

When the viewer of scene 200 moves from the first vantage point shown in FIG. 2 to a second vantage point that is slightly (for example, a change of perspective of approximately 10 degrees of parallax angle between the first and viewpoints and a vanishing point 211), the structure of the scene remains generally the same, but the relative positions of the objects within the frame of the image of scene 200 changes with the shift in perspective. For example, a step or two to the left causes first tree 207 to move to the right within the frame of the image. Similarly, the same move to the left between a first perspective and a second perspective causes second tree 209a to move, albeit to a lesser extent, to the right within the frame of the image. Further, the difference in relative shift between first tree 207 and second tree 209a causes first tree 207 to occlude a greater portion of second tree 209a. The above-described parallax shift effects (i.e., changes of position within the frame and the size and shape of occluded portions) can create the appearance of three-dimensionality, even when performed over relatively small changes in perspective.

While it is possible to determine the changes in objects' position and occluded regions by performing a general three-dimensional reconstruction of the scene (for example, by using Matterport or other full reconstruction software), such approaches can place significant loads on limited processor and battery resources, to produce a reconstruction of an scene at a level of detail far greater than what is necessary to create the parallax-shift effects that can impart the appearance of three-dimensional depth to a two-dimensional view of a scene. More specifically, instead of generating a full understanding of every view and spatial relationship between all of the objects in a scene which can support reprojections of the scene from any vantage point, certain embodiments according to the present disclosure employ a more computationally efficient approach, wherein the objects of the scene are determined as belonging to various layers of a multi-layer model, and parallax shift effects are determined on a layer-by-layer basis, rather than according to a generalized model of a point map of the scene. In this way, certain embodiments according to the present disclosure allow for the creation of two images which exhibit parallax shift effects sufficient to give the appearance of three-dimensionality, but do not require image data from a wide range of vantage points or heavy computational loads associated with a general three-dimensional scene reconstruction.

Figure 3:
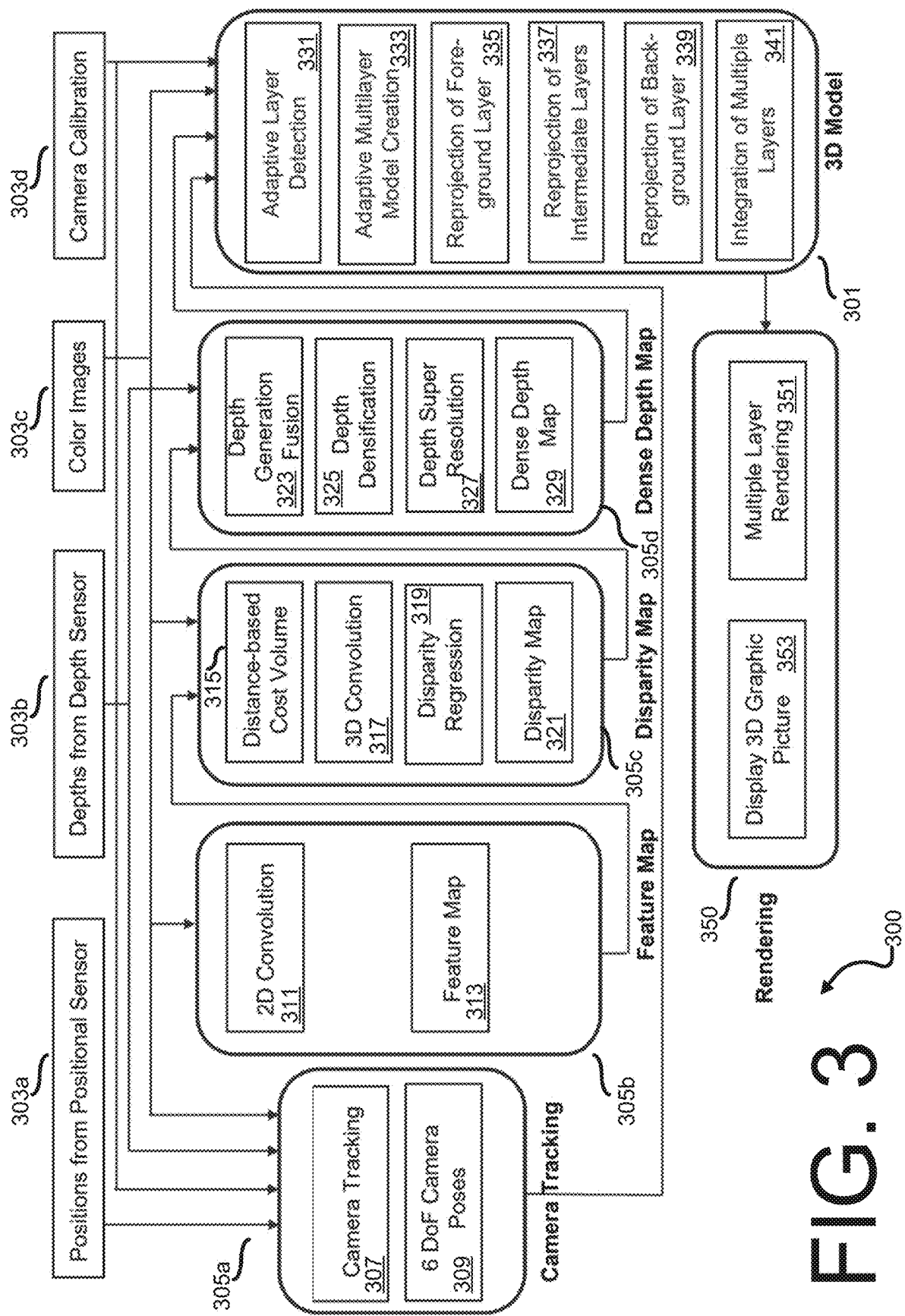
FIG. 3 illustrates an example of an architecture for generating a three-dimensional photographic image according to certain embodiments of this disclosure.

FIG. 3 illustrates an example architecture 300 for generating images with parallax shift effects providing an appearance of three-dimensional depth, according to various embodiments of this disclosure. The architecture described with reference to FIG. 3 can be implemented at any suitable computing platform with a processor connected to a display (for example, device 100 in FIG. 1). As discussed with reference to the example of FIG. 2, developing a general representation of a scene can be computationally expensive and require significant amounts of source data obtained from image and/or depth map measurements conducted from a plurality of vantage points. By contrast, certain embodiments according to this disclosure provide photographic images which exhibit sufficient parallax effects to create a convincing perception of three-dimensionality in a way that requires much less source data and computational effort. The computationally inexpensive methods according to the present disclosure provide the technical benefits of being complementary with the sensor and image analysis used by applications which produce a general representation of a scene. Thus, while the mapping and analysis tools utilized by such applications are not required to generate a multi-layer model of a scene, certain embodiments according to this disclosure can leverage such tools if available.

Referring to the illustrative example of FIG. 3, architecture 300 provides an example of a multi-layer modeling pipeline 301 which can operate in concert with, and leverage the analyses of an architecture for obtaining a general representation of a scene. As shown in the illustrative example of FIG. 3, information of a scene may be obtained from at least four sources, including, without limitation, positional sensor information 303a, depth sensor information 303b, one or more items of image information 303c and camera calibration information 303d. According to various embodiments, positional sensor information 303a comprises information regarding the position, movement and pose of a camera providing two-dimensional image information. Positional sensor information 303a may be obtained from, without limitation, global positioning sensors, inertial measurement units and accelerometers.

As shown in FIG. 3, the information of a scene may also comprise depth sensor information 303b, which, in some embodiments, comprises information obtained from one or more of a LIDAR, time of flight (TOF) depth sensor, or other sensor capable of taking range measurements of points relative to a vantage point. According to various embodiments, the information of the scene may also include image information 303c. Image information 303c may comprise frames of color image data obtained by a photosensor (for example, a CMOS sensor) or a stream of sensor event data obtained by a dynamic vision sensor over a predetermined interval. As shown in FIG. 3, the information of the scene may include camera calibration information 303d, which includes, without limitation, information as to the focal length, aperture setting and other information used in translating image data from the one or more cameras into depth data.

Referring to the illustrative example of FIG. 3, according to various embodiments, architecture 300 comprises one or more modules 305a-305c that translate the sensor information 303a-303d of the scene into one or more mappings of objects to values in a physical coordinate system. Depending on the application, the mappings of objects to values in a physical coordinate system may comprise a semantic mapping of the objects (i.e., specifically recognizing the objects as belonging to an identified type or class of objects) as occupying specific coordinate ranges within a cartesian coordinate system. In some applications, a more computationally lightweight, approximation-based mapping of objects to coordinates is performed. For example, instead of recognizing a given object in a scene as a table with legs and a top, the sensor determines that a rectangular prism of a specified size is disposed at a given range from the apparatus.

As shown in FIG. 3, architecture 300 comprises a camera tracking module 305a, which receives one or more of positional sensor information 301a, depth sensor information 301b, image information 303c, and camera calibration information 303d, to track and determine a location and viewing angle (collectively referred to as a camera pose) defining the perspective associated with depth sensor information 303b and image information 303c. According to various embodiments, camera tracking module 305a comprises a visual-inertial simultaneous localization and mapping ("VSLAM") pipeline (for example, the OpenVSLAM software system), which receives, at a minimum, camera image information 303c and positional sensor information 303a to generate a mapping of visual objects within the operating environment of one or more cameras. According to various embodiments, VSLAM pipeline 307 outputs a set of 6 degree of freedom (for example, 3 axis coordinates indicating the location of the camera, and 3 axis coordinates indicating the view angle) pose coordinates associated with each frame of image data, from which elements of the spatial structure (i.e., the locations of scene objects relative to a viewpoint) of a viewed scene can be obtained.

As shown in FIG. 3, architecture 300 further comprises a feature mapping module 305b, which, according to various embodiments, analyzes frames of image data to recognize object features (for example, objects, corners, or planes) in the image data, so that frames of image data of the same scene, but taken from different vantage points, can, with the help of camera tracking data obtained from camera tracking module 305a, be compared, and the spatial structure of the scene being inferred from the differences in feature location across frames of image data obtained from different camera poses. According to various embodiments, feature mapping module 305b comprises one or more deep neural networks (DNNs) which are trained to recognize features within image data, the DNNs may include on or more convolutional layers 311, wherein image data is passed at varying degrees of granularity (for example, by downsampling the image data) through one or more filters, to output one or more feature maps showing where the image data activates or triggers one or more of the filters.

Referring to the non-limiting example of FIG. 3, architecture 300 further comprises a disparity mapping module 305c, which receives as inputs feature maps of two or more frames of image data from feature mapping module 305b, and outputs disparity maps expressing the spatial differences between features common to each of the frames of image data. These disparity maps can, in conjunction with camera pose information output by camera tracking module 305a, be used to perform parallax-based depth estimation of objects in the scene, based on their movement in the image data frames relative to the change in perspective between image data frames. According to various embodiments, disparity mapping module comprises one or more deep neural networks which apply a distance-based cost volume computation 315 and one or more convolutional layers 317 to match features between feature maps, followed by a disparity regression calculation 319 to quantify and express, through disparity maps 321, the disparities between features common to one or more feature maps.

According to various embodiments, architecture 300 further comprises a dense depth mapping module 305d, which outputs a dense depth map of the scene, as captured by image information 303c and depth sensor information 303b. According to various embodiments, depth mapping module 305d performs depth generation fusion 323, wherein one or more depth maps provided as depth sensor information 303b are combined, or fused, to provide a single depth map for the scene. According to various embodiments, depth generation fusion 323 is assisted by the outputs of one or more of camera tracking module 305a, feature mapping module 305b and disparity mapping module 305c. According to various embodiments, depth mapping module 305d further comprises a depth densification stage 325, which fills in gaps and holes in a fused depth map, by, for example, guided interpolation. In some embodiments, depth mapping module 305d also includes a depth super resolution stage 327, which up-samples lower resolution depth maps to create higher-resolution depth maps. As shown in FIG. 3, dense depth mapping module 305d outputs one or more dense depth maps 329.

Referring to the non-limiting example of FIG. 3, architecture 300 further comprises three-dimensional modelling pipeline 301. As shown in the explanatory example of FIG. 3, the inputs to three-dimensional modelling pipeline 301 include, at a minimum, image information 303c comprising one or more frames of image data of a scene with at least a background and one or more three-dimensional objects. Depending on embodiments, three-dimensional modelling pipeline 301 may also receive as inputs, data indicative of the spatial structure of physical objects appearing in the image information, including, without limitation, depth sensor information 303b, or maps output by one or more of feature mapping module 305b, disparity mapping module 305c or dense depth mapping module 305d. According to various embodiments, three-dimensional modelling pipeline 301 comprises an adaptive layer detection stage 331, which identifies objects within the scene and their depths relative to a vantage point, and generates a candidate set of layers. As used in this disclosure, the expression "layer" encompasses an imaginary plane or space between two imaginary planes at a predefined depth or range of depths relative to a camera.

According to some embodiments, three-dimensional modeling pipeline 301 further comprises an adaptive multi-layer creation stage 333, during which a set of layers from the candidate layers detected for the image is selected as the layers which are calculated and reprojected to provide parallax shift effects in response to changes in perspective. As discussed elsewhere in this disclosure, in some embodiments, adaptive multi-layer model creation comprises determining a number of planes in a model as well the orientation of the planes (for example, by determining a line connecting the camera to a vanishing point, which is normal to the planes of the plane model) which satisfies one or more predetermined criteria. Examples of predetermined criteria include, without limitation, a requirement that detected objects of a threshold size get their own plane in the plane model, or a requirement specifying a maximum number of planes. As discussed elsewhere in this disclosure, the multi-layer models utilized by certain embodiments according to this disclosure, permit two-dimensional images to be reprojected in response to inputs simulating changes in perspective (for example, a user tilting a device, or moving relative to the device) such that the reprojected images exhibit the parallax shift effects associated with changing perspective while looking at a 3-D object. In this way, certain embodiments according to this disclosure can provide images which appear three-dimensional, while avoid the heavy computational loads and large source data requirements associated with generating a general representation of the scene and all of the objects therein. As shown in the illustrative example of FIG. 3, three-dimensional modelling pipeline 301 performs a first reprojection 335 of a foreground layer to account for inputs at the electronic device associated with a change in perspective. According to various embodiments, first reprojection 335 comprises moving one or more objects of a foreground layer within an image frame to account for the parallax shift associated with a change in perspective (for example, moving a foreground image to the left of the frame in response to an input associated with a perspective shift to the right). Depending on the multi-layer model used, in some embodiments, three-dimensional modelling pipeline 301 performs a second reprojection 337 of one or more intermediate layers. According to various embodiments, second reprojection 337 comprises determining one or more parallax shifts within the frame of one or more objects at depths between the foreground and background, and may also include determining which pixels are occluded by objects in layers closer to the camera. Referring to the illustrative example of FIG. 3, three-dimensional modelling pipeline 301 also performs a third reprojection 339 of a background layer. Depending on the depth of the background layer relative to the camera in the multi-layer model, third reprojection 339 comprises, at a minimum, determining which portions of the background are occluded by objects in the foreground, and if applicable, intermediate layers. In certain embodiments, where the multi-layer model specifies that the background is not modeled as being at an infinite distance from the camera, third reprojection 339 comprises determining a parallax shift for the background.

As shown in the explanatory example of FIG. 3, three-dimensional modelling pipeline 301 further performs an integration of the reprojected layers, building up a single image associated with a current viewpoint input which layers each of the reprojected constituent layers. The integrated image is passed to a graphics pipeline 350 which generates a rendering 351 of the multi-layer image, and displays same at one or more displays of an electronic device at block 353.

Figure 4:
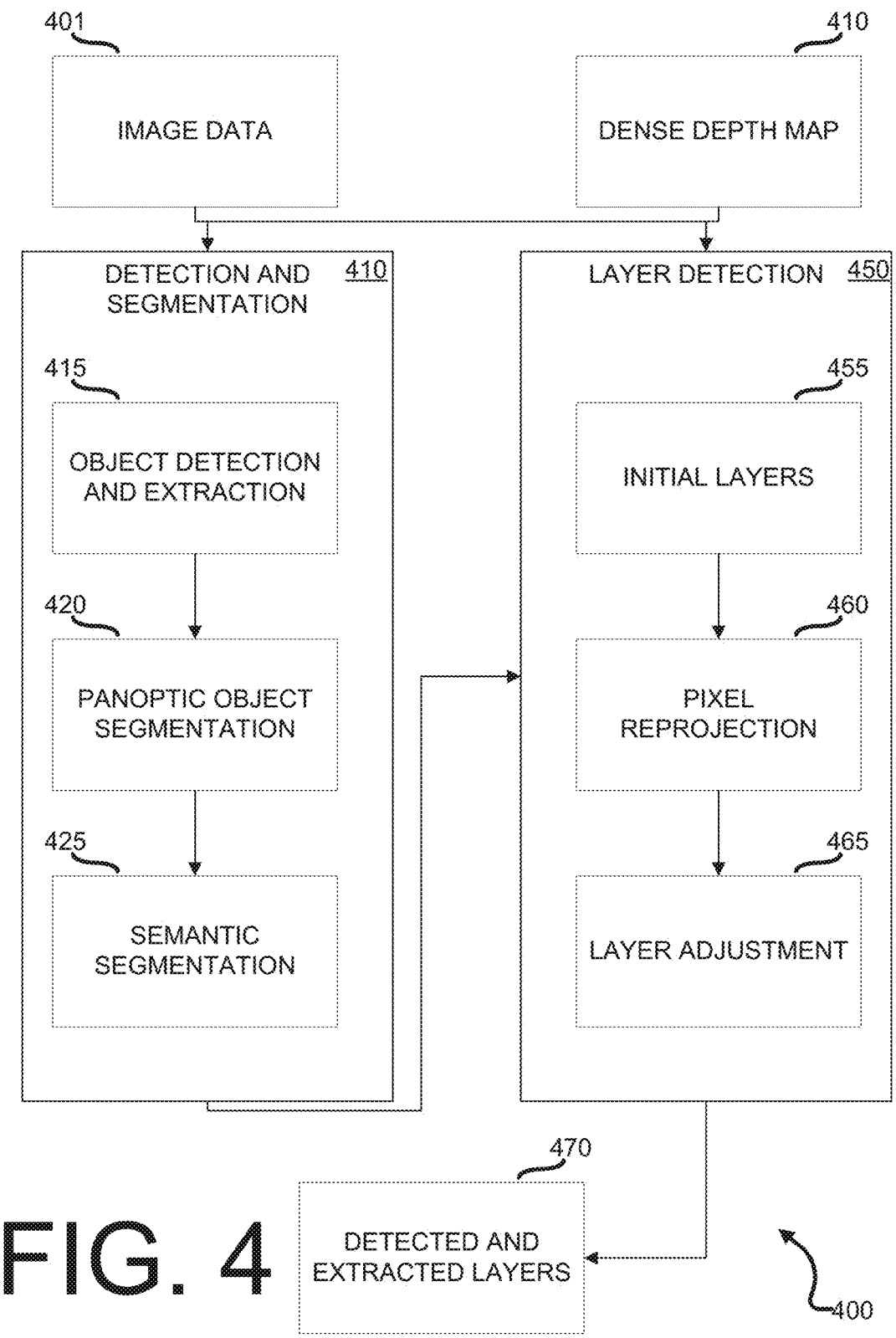
FIG. 4 illustrates an architecture for layer detection and extraction according to certain embodiments according to this disclosure.

FIG. 4 illustrates, in block diagram format, elements of an example method 400 for detecting and extracting layers from one or more frame of image data (for example, an image of scene 200 in FIG. 2 or image information 303c in FIG. 3). As discussed with reference to FIGS. 2 and 3, certain embodiments according to this disclosure analyze image (and where available, depth or detected object information) to obtain, at a minimum, a partial understanding of a real-world scene represented in the image data. As used in this disclosure, the expression "partial understanding of a real-world scene" encompasses, without limitation, an identification of a first set of pixels of image data belonging to a background of a scene, and a second set of pixels of image data associated with at least one foreground object of the scene, and one or more measurements expressing the depth of the at least one foreground object of the scene. Put differently, as used in this disclosure, a "partial understanding of a real-world scene" encompasses an identification and quantification of at least one object relative to a background that can be provided to a suitable multi-layer model and can support parallax shift effects in response to inputs associated to moderate changes in perspective that are sufficient to create the appearance of three-dimensional depth.

Referring to the illustrative example of FIG. 4, the inputs to method 400 comprise at least one frame of image data 401 (for example, data obtained by a CMOS sensor of a digital camera) of a scene. In some embodiments, the frame of image data 401 comprises a raster of pixels of image data (for example, values in a color space) of a scene comprising a background and one or more three-dimensional objects in front of the background. According to some embodiments, the inputs to method 400 further comprise a dense depth map 405 of the scene (for example, dense depth map 329 in FIG. 3) generated based on one or more of depth sensor information or derived from analyzing disparities across frames of image data of the scene taken from a plurality of known poses.

Referring to the illustrative example of FIG. 4, in certain embodiments according to this disclosure, layer information of a scene is detected based on color image data and a dense depth map (for example, a dense map output by dense depth mapping module 305d in FIG. 3) of the scene. As used in this disclosure, the expression "layer information of a scene" encompasses the association or mapping between pixels or regions of pixels in image data with depth values. Put differently, the layer information of a scene comprises a machine-usable representation of the three-dimensional structure associated with a two-dimensional image. In certain embodiments according to this disclosure, once the layer information of a scene has been detected, a suitable multi-layer model of the scene may be determined. As used in this disclosure, the expression "multi-layer model of a scene" encompasses a representation of the three-dimensional scene shown in the image and depth data, not as a plurality of discrete three-dimensional objects (as is computed in a general three-dimensional reconstruction of a scene), but rather, a simplified representation as a set of parallel layers, which move at depth-based rates within the frame relative to each other, such that, for a limited range of changes in perspective point, the relative motion of the layers creates the appearance of three-dimensionality at a fraction of the computational cost of generating a general three-dimensional reconstruction of a scene.

Referring to the illustrative example of FIG. 4, image data 401 and dense depth map 405 are initially passed to detection and segmentation stage 410. According to various embodiments, detection and segmentation stage comprises one or more convolutional neural networks for performing object detection and extraction 415. In some embodiments, object detection and extraction 415 comprises applying regional convolutional neural network (R-CNN) techniques to the image data, wherein candidate regions containing CNN features are initially identified, and then a candidate region-wise analysis of the CNN features within each candidate region is performed. In some embodiments, object detection and extraction 415 may be performed using other machine learning based image recognition techniques, such as you only look once (YOLO) techniques, which can be faster than R-CNN, but at the potential expense of accuracy and depth.

Following object detection and extraction 415, detection and segmentation stage 410 implements panoptic object segmentation 420. According to various embodiments, panoptic object segmentation 420 comprises identifying specific instances of detected objects within the image data. As one illustrative example, consider a case where a region of image data 401 comprises two humans standing in front of a car. Panoptic object segmentation 420 comprises processing the image data to recognize that the region contains three distinct objects. Implementations of panoptic object segmentation 420 suitable for use in method 400 include, without limitation, the EfficientPS library in the OpenDR toolkit. Further, detection and segmentation stage 410 comprises performing semantic segmentation 425. According to various embodiments, performing semantic segmentation 425 comprises assigning one or more semantic labels to each instance of an identified object. Examples of semantic segmentation tools suitable for performing semantic segmentation 425 include, without limitation, the SegNet and OpenCV Python toolkits.

According to various embodiments, detection and segmentation stage 410 outputs a mapping of pixel regions (for example, a semantic mask) of image data 401 to instances of detected and classified objects. For example, in the explanatory example of FIG. 2, the semantic mapping of scene 200 identifies the regions within the image frame belonging to first tree 207, and subsequent instances 209a-209c of trees. According to certain embodiments, the image data 401 and dense depth map 405 have a common scale and frame size, such that points in image data 401 correspond to points in dense depth map 405.

As shown in the explanatory example of FIG. 4, the semantic mapping of image data 401 and the dense depth map 405 are passed to layer detection stage 450, which determines an initial layer structure 455 of the scene as represented in image data. According to certain embodiments, initial layer structure 455 comprises an object-level division of depth data into a default number of layers. According to some embodiments, the default number of layers for an initial layer structure 455 is two layers-comprising a background and a foreground, which for most scenes, is the minimum required to perform perspective change-based reprojections of the image in a way that creates parallax effects providing the appearance of three-dimensionality. In some embodiments, the default number of layers may be greater, such as three layers, associated with a foreground, intermediate depth and background. In certain embodiments, initial layer structure 455 may be keyed to the detected objects in the image, with each object having its own layer, at least initially. According to various embodiments, once initial layer structure 455 has been determined, a pixel reprojection 460 is performed, wherein the pixel regions are mapped to the constituent layers of initial layer structure 221. Subsequent to pixel reprojection 460, a layer adjustment 465 may be performed, wherein initial layer structure is refined (for example, by adding or removing layers) based on the results of the pixel reprojection. As noted elsewhere in this disclosure, certain embodiments according to the present disclosure provide the technical benefit of a computationally lightweight way of re-rendering a two-dimensional image perspective-dependent parallax effects which give the image the appearance of three-dimensionality. In some cases, an initial layer structure may include layers which add unnecessarily to the computational cost of reprojection without providing any palpable contribution to a perspective-dependent parallax effect. As one example, consider the case of objects at comparatively large depth values, but are assigned to separate layers in front of a background layer. In such cases, changes in perspective may cause pixel-sized or sub-pixel sized shifts in such objects' location within an image frame. Given the miniscule shifts in perspective of such far-field objects, it may be more efficient to "collapse" the layer structure and assign such objects to a static background layer, to reduce the complexity of perspective-based reprojections. According to various embodiments, pixel reprojection 460 and layer adjustment 465 may be performed recursively, based on the observed computational load and efficacy of reprojecting the contents of image data from different perspective points. As shown in FIG. 4, a set of detected layers 470 is output so that a multi-layer model for the scene may be determined.

Figure 5:
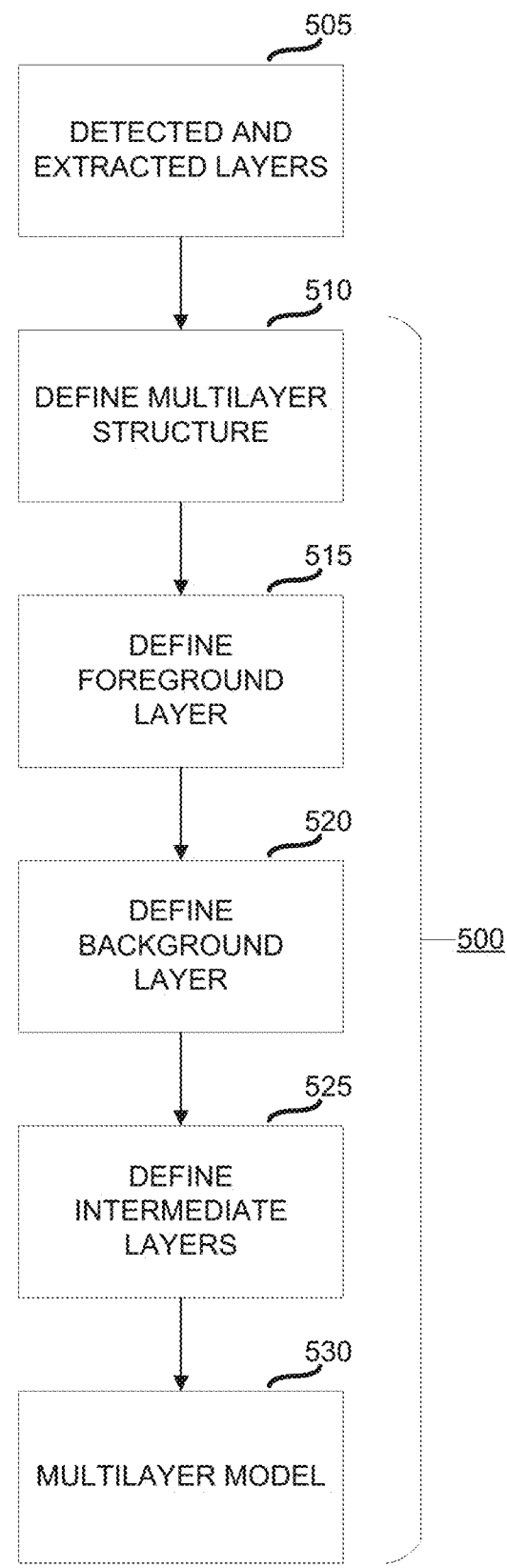
FIG. 5 illustrates an example method for generating a multi-layer model according to certain embodiments of this disclosure.

FIG. 5 describes operations of an example method 500 for determining a multi-layer model for a real-world scene (for example, scene 200 in FIG. 2). According to various embodiments, method 500 determines a layer structure and one or more projection variables (for example, a vanishing point, or a vector expressing a normal to the layers of the multi-layer model, such that inputs associated with changes in perspective (for example, tilting a smartphone, or changing the pose of a head mounted display) cause the layers to shift relative to one another, thereby producing parallax effects conveying the appearance of three-dimensionality.

Referring to the non-limiting example of FIG. 5, the inputs to method 500 comprise the layers (for example, layers 470) of a real-world scene extracted from image data and dense depth map data. According to certain embodiments, at operation 510, the processor defines a multi-layer structure for rendering and re-rendering image data to provide perspective-based parallax effects. In some embodiments, operation 510 further analyzes the structure of the layer structure 505 to determine whether the existing layer structure satisfies one or more criteria associated with providing parallax effects in a computationally efficient manner. According to various embodiments, at operation 510, a processor examines a representation of the layer structure relative to the detected objects of the image (for example, a histogram of object pixels relative to depth) to determine whether the layers bound peaks of the histogram (i.e., to avoid the computational waste associated with treating a single object as belonging to separate layers of a multi-layer model) and to identify objects at depth values which exhibit minimal parallax-related movement in response to perspective shifts. Additionally, at operation 510, the processor may examine the image data to determine whether there is significant horizontal spacing between identified objects in the frame, and may adjust one or more variables of the multi-layer model, such as the location of a vanishing point.

In some embodiments, where there are multiple objects dispersed across the frame of the image, but the objects have similar depth values, moving the vanishing point from the center of the frame to a side of the frame. In this way, the lateral spacing of the objects can contribute to depth differences between the objects, and as such, the parallax effects associated with perspective changes may be enhanced.

According to various embodiments, the multi-layer model structure defined at operation 510 comprises, at a minimum, a foreground layer comprising at least one object that moves laterally within the frame of an image when the perspective shifts in a direction perpendicular to a ray connecting a vanishing point with a current vantage point, and a background layer comprising a field or field of objects that the at least one object in the foreground layer moves relative to when the perspective changes in a direction perpendicular to the ray connecting the current vantage point with the vanishing point. According to various embodiments, depending on the available computing resources and the depth structure of the detected objects in the image data, the multi-layer structure may also comprise one or more intermediate layers. According to various embodiments, at operation 515, a foreground layer is defined. In some embodiments, the foreground layer comprises one or more detected objects having the closest depth values and spaced in the scene such that they will not be occluded by other objects. According to various embodiments, the foreground layer is associated with a range of depths from zero (i.e., directly on the camera) to a first threshold value.

As shown in FIG. 5, at operation 520, a background layer of the multi-layer model is defined. According to various embodiments, the background layer comprises objects at depth values from a threshold value to infinity, which do not appreciably move within the frame in response to small changes in perspective, and which are, by definition, occluded by objects in the foreground and intermediate layers. Depending on the multi-layer structure defined at operation 510, at operation 525, one or more intermediate layers of a multi-layer model may be defined. According to various embodiments, the intermediate layers comprise layers of the model associated with depth values between the first threshold value and the threshold value demarcating the start of the background layer. A multi-layer model 530 comprising the multi-layer structure defining the overall number of layers, and projection parameters (for example, the location of a vanishing point in the frame), and the depth values of each of the foreground, background and intermediate layers is output. It should be noted that, in certain embodiments according to this disclosure, the multi-layer model can be determined dynamically or iteratively, such in response to additional depth or image data becoming available for layer detection and model construction.

Figure 6:
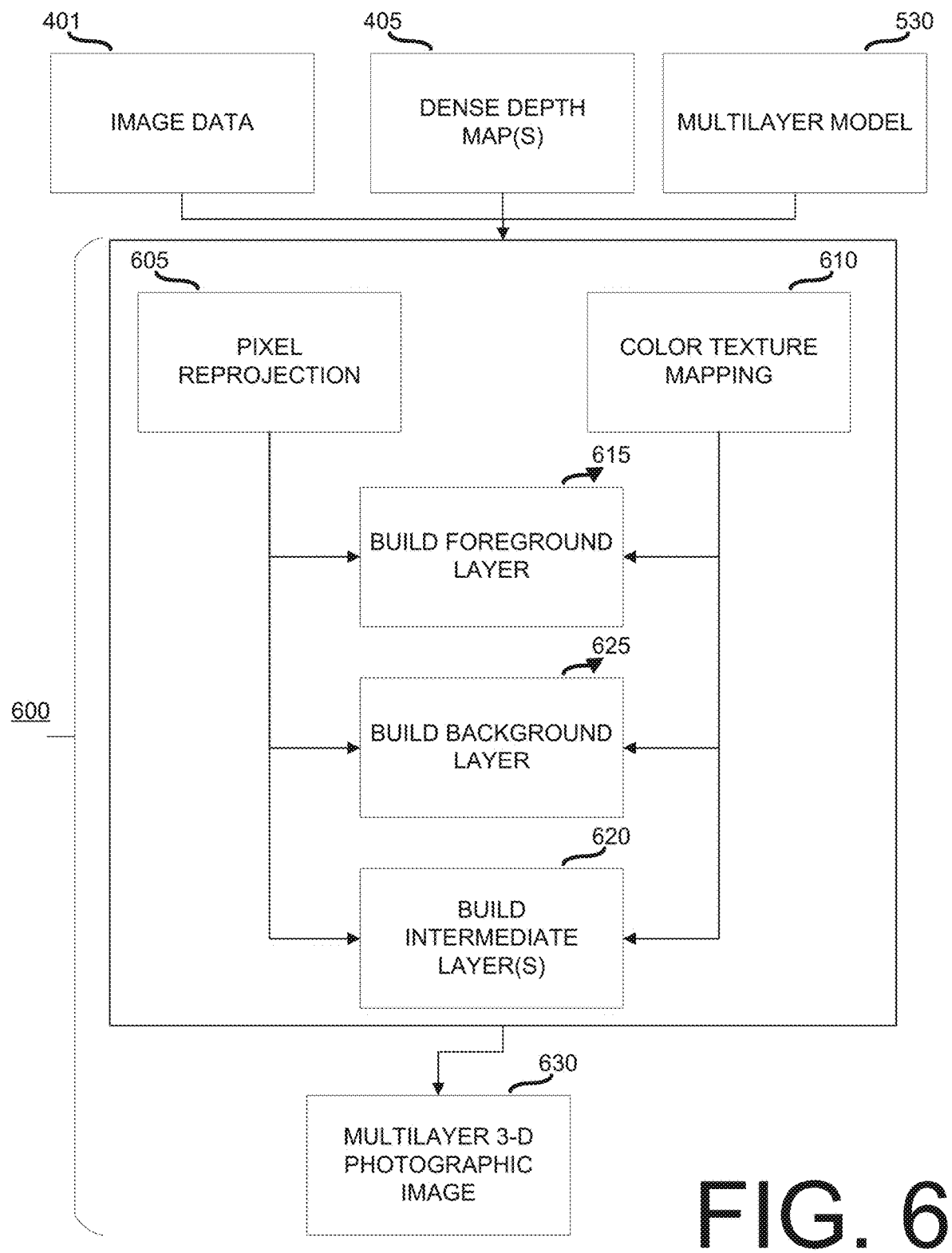
FIG. 6 an example method for generating a multi-layer three-dimensional photographic image according to certain embodiments of this disclosure.

FIG. 6 illustrates, in block diagram format, an example method 600 for generating a two-dimensional image with parallax shift effects providing an appearance of three-dimensional depth according to various embodiments of this disclosure. For convenience of cross-reference, elements of FIG. 6 which are common to other figures of this disclosure are numbered similarly. At a macro-level, method 600 comprises reassembling the constituent layers of image data to account for the changes in occlusion of intermediate and background layers, as well as the shifts in position of the foreground and intermediate layers within the frame of an image due to an input associated with a change in vantage point.

Referring to the illustrative example of FIG. 6, the inputs to method 600 comprise image data 401, dense depth maps 405 and a current multi-layer model of the scene. According to certain embodiments, reprojection of the image data at a new vantage point is performed by reassembling the layers (i.e., foreground, background, and where appropriate, intermediate layers) of multi-layer model 530. Thus, at fundamental level, certain embodiments of method 600 reproject the source pixels of image data 401 within a frame to new locations within the frame based on the input changing the viewing perspective, as applied to multi-layer model. Additionally, certain embodiments according to the present disclosure update color textures of reprojected pixels based on the input changing the viewing perspective. According to some embodiments, updating color textures can include, without limitation, changing the brightness of certain pixels to account for perspective-based changes in the shapes and locations of shadows, and where a change in perspective reveals previously occluded pixels, sampling and extending color textures from nearly regions to "fill in" the revealed areas.

As shown in the explanatory example of FIG. 6, at operation 605, for each of the constituent layers of multi-layer model 530, the pixels are reprojected in response to an input simulating a shift in perspective in a direction perpendicular to a ray connecting the current vantage point with the vanishing point specified by multi-layer model 530. Where the shift in perspective comprises a relatively small angular change, reprojection of the pixels for each layer can be computationally simple and involve taking the product of the difference in viewing angle between the original vantage point and the new vantage point by a value expressing the depth of the layer relative to a depth of a virtual pivot point. In this way, objects in the foreground move more in response to changes in viewpoint, and objects further back within the frame move proportionally less in response to shifts in viewpoint.

According to various embodiments, method 600 further comprises performing color texture mapping operation 610, wherein, for previously occluded portions of identified objects whose shapes can be discerned from dense depth maps 405, the color texture or surface patterns of the object are mapped onto the revealed portions of the objects. In certain embodiments, color texture mapping may also be used to compute changes in the location and visibility of shadows in an image in response to the change in perspective.

In some embodiments of method 600, a new 3-D image is constructed in a front-to-back method, working back from a reprojection of the foreground layer to the intermediate layer(s) to the background layer. In this way, the computational load associated with determining the occlusions between objects in layers is reduced, as the objects in each layer necessarily occlude everything along a sight line between the object's silhouette and the current object. This implies that, for the intermediate and background layers, the number of pixels in the layers in which new occlusions have to be determined is steadily reduced as increasingly distant layers are constructed.

Referring to the explanatory example of FIG. 6, in some embodiments, at operation 615, the foreground layer is built, which in certain embodiments, comprises moving the pixels of the identified objects to new locations in the image frame based on the magnitude and direction of an input associated with a change in perspective, as applied to multi-layer model 530. In embodiments in which the foreground layer comprises image data of unobstructed objects, operation 615 may only comprise determining new locations of objects, as there are no occlusions or extensions of color textures to be performed.

According to various embodiments, where multi-layer model 530 specifies one or more intermediate layers, at operation 620, the locations of the image frame are determined at operation 620, along with the changes in occlusions of objects of each intermediate layers by objects in layers closer to the foreground layer. Where the reprojection of layers forward of an intermediate layer reveals previously occluded portions of one or more objects in the intermediate layer, at operation 620, the color texture of the revealed portion of the object may be extended to fill the gap. In some embodiments, as part of a semantic segmentation process, the instances of identified objects may be mapped to a template for instances of the object. In this way, the shape of revealed portions of an object may be extended based on a template instance of the object. For example, where a hand is an recognized object in an intermediate layer, and the change in occlusion due to a new perspective reveals more of a finger, in some embodiments, mapping a color texture to the revealed space may involve using a template form for a human hand, so that the color of the existing fingers is not extended indefinitely, or in a way that would otherwise appear unnatural.

Referring to the illustrative example of FIG. 6, at operation 625, the background layer is built. Depending on the characteristics and depth values associated with the constituent layers of multi-layer model 530 (for example, the depth value at which the background layer begins), operation 625 may be limited to updating the occlusions of the background layer by the intermediate and foreground layers. In some embodiments, to reduce the computational load associated with generating an image exhibiting aspects of three-dimensionality, the background layer is defined as being associated with a depth value having no perceptible change in appearance due to changes in viewing angle across a predefined, limited range of viewing angles. According to some embodiments, a multi-layer three-dimensional photograph 630 is output and can be rendered for display at a device. By iterating the operations of method 600 across a range of vantage points to produce a new instance of three-dimensional image 630 at each vantage point, the objects of each layer will move relative to each other in a way that, to a human viewer, appears as if a two-dimensional image projected on a digital display has three-dimensional depth.

Figure 7A:
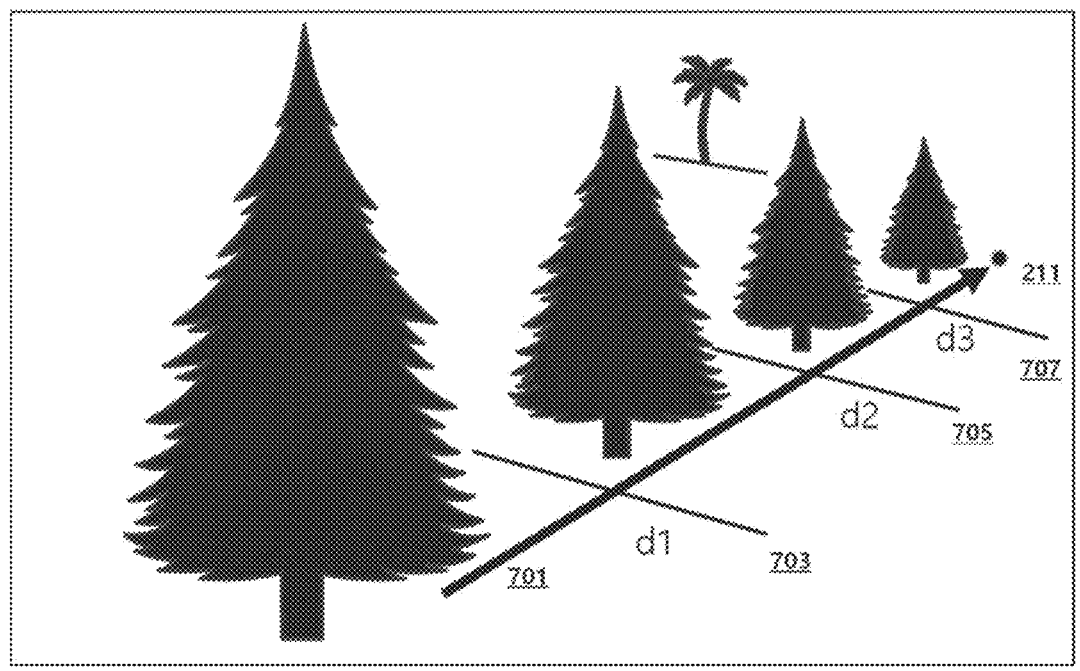
FIGS. 7A and 7B illustrate aspects of generating a multi-layer model according to certain embodiments of this disclosure.
Figure 7B:
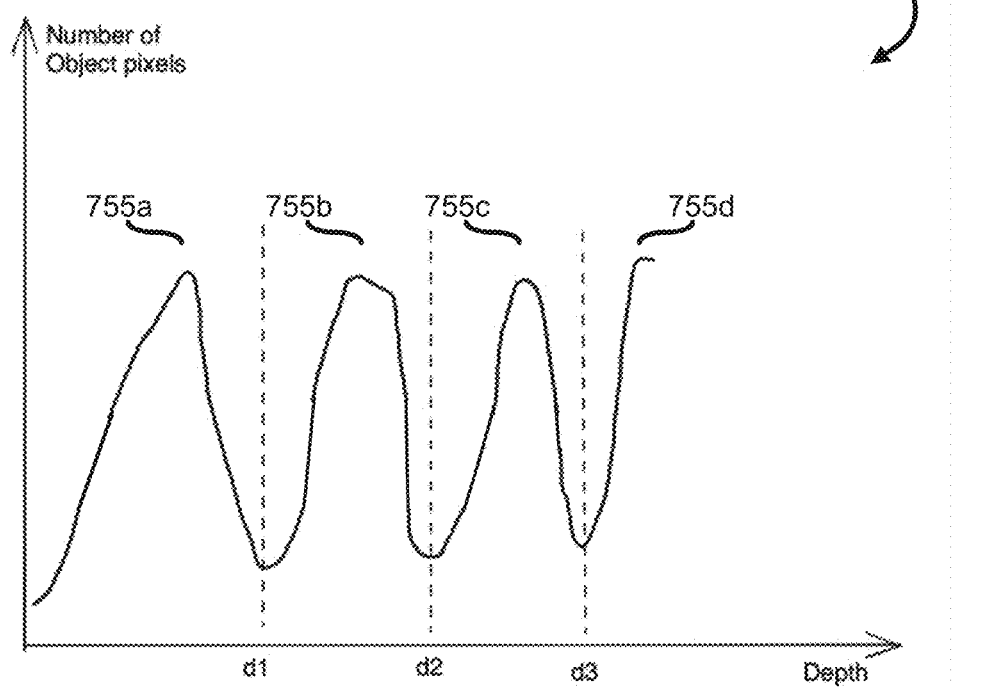

FIGS. 7A and 7B illustrate aspects of a layer structure, as applied to image and depth data of a real-world scene. For convenience of cross-reference, elements common to both of FIGS. 7A and 7B are numbered similarly. Additionally, to avoid redundancy elements of FIGS. 7A and 7B common to other figures of this disclosure are numbered according to the figure in which originally described.

Referring to the illustrative example of FIG. 7A, scene 200 from FIG. 2 is shown in the figure, in conjunction with a determined multi-layer model for reprojecting the objects (for example, first tree 207, and second, third and fourth trees 209a-209c. As shown in FIG. 7A, a multi-layer model providing a depth-based decomposition of scene 200 into foreground, background and two intermediate layers has been determined based on the image and depth data of scene 200 as applied to the methods described with reference to FIGS. 3-6 of this disclosure. As noted elsewhere in this disclosure, in determining a multi-layer model for efficiently calculating reprojections in response to changes in perspective, the tunable variables may include the position of the vanishing point in the image frame. Where the objects in the image frame exhibit significant separation across the image frame, it may be advantageous to move the vanishing point of the multi-layer model to the periphery of the frame, to increase the depth disparity between objects, where depth is measured along a ray connecting a current vantage point with the vanishing point of the multi-layer model. As shown in FIG. 7A, in the multi-layer model for scene 200, a vanishing point 211, located towards the periphery of the image frame has been selected, and a ray 701 connects the vantage point (i.e., the current location of the camera obtaining image and depth data of scene 200) with vanishing point 211. Further, the multi-layer model contains one or more depth values (shown in FIG. 7A as $d_1$, $d_2$, and $d_3$) indicating the depth values of the boundaries between the constituent layers of the multi-layer model. In this explanatory example, the foreground comprises the objects between the vantage point and $d_1$. Similarly, the first intermediate layer of the multi-layer model is bounded by $d_1$ and $d_2$, the second intermediate layer is bounded by $d_2$ and $d_3$, and the background layer comprises everything from $d_3$ to infinity. According to certain embodiments, the multi-layer model also comprises parallel lines (for example, lines 703, 705, and 707) which are projections of lines perpendicular to the ray 701 connecting the vantage point of the image with vanishing point 211. In the illustrative example of FIG. 7A, in response to an input (for example, tilting a smartphone or head movement at an HMD) associated with a shift in vantage point, the objects of each of the constituent layers are shifted along the parallel lines perpendicular to ray 701, thereby creating the appearance of three-dimensionality.

In many cases, the effectiveness and computational efficiency with which embodiments according to this disclosure can reproject image data to provide parallax effects is closely tied to the extent to which the multi-layer model ensures the parallax movement of objects which a viewer expects to move in response to changes in perspective, and at the same time, avoids redundant (i.e., by splitting a single object across two more layers, causing the object to be reprojected two or more times) or unnecessary (for example, determining imperceptible parallax shifts of objects at high depths).

FIG. 7B illustrates aspects of determining a multi-layer model structure according to various embodiments of this disclosure. Referring to the explanatory example of FIG. 7B, a histogram 750 mapping object pixel counts (i.e., pixels associated with identified objects) to determined object depths along ray 701 is shown in the figure. As shown in the figure, when measured along ray 701 depth-object pixel count histogram 750 comprises a first peak 755*a*, a second peak 755*b*, a third peak 755*c* and a fourth peak 755*d*, with well-defined troughs separating each of the peaks. Skilled artisans will appreciate that, if a different location for vanishing point 211 were chosen for the multi-layer model, and the depth between objects were measured along a different line, the clear separation between first through fourth peaks 755*a*-755*b* may not be present. Thus, one of the factors affecting the determination of a multi-layer model is selecting a vanishing point location, which, to the greatest extent possible, provides clear separation between the peaks and valleys in depth-object pixel count histogram 750. Where a vanishing point providing "best available" separation between the peaks and valleys of depth-object histogram may be found, the foreground, intermediate and background layers may be set based on the local minima of depth-object pixel count histogram 750.

Figure 8:
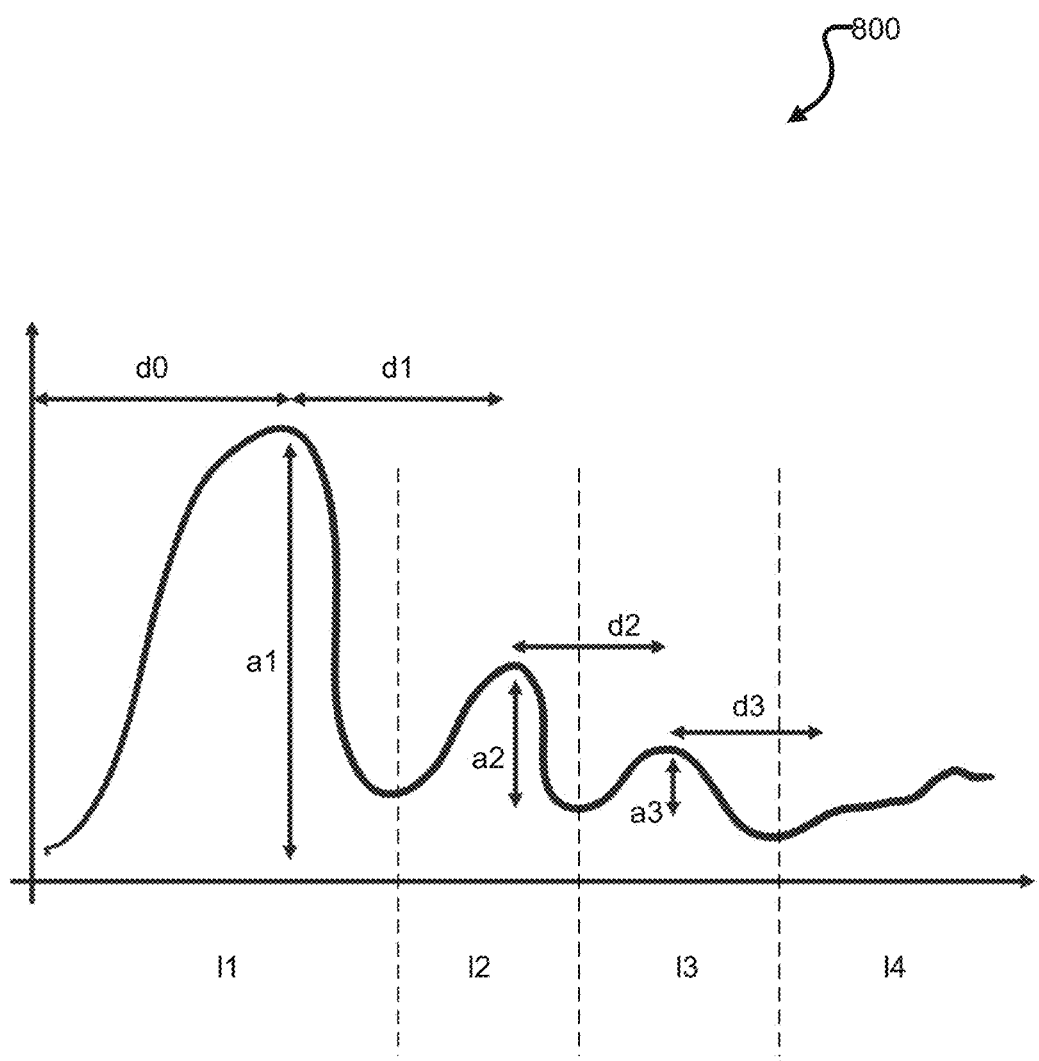
FIG. 8 illustrates aspects of determining an optimum number of layers of a multi-layer model according to various embodiments of this disclosure.

FIG. 8 illustrates further aspects of determining a multi-layer model (for example, multi-layer model 530) according to various embodiments of this disclosure. In addition to setting a vanishing point that provides clear separation between the peaks of a depth-object histogram, a further variable is determining an optimal number of constituent layers of the multi-layer model. In many cases, the appearance of three-dimensionality due to changes in perspective derives from the relative motion between the objects of layers of different depth value. Thus, where one or more conditions for perceptible parallax-based relative motion between objects of different is not met, the multi-layer model may be simplified to eliminate calculation of layers which do not contribute to provide an appearance of three-dimensionality. According to some embodiments, the conditions for perceptible parallax-based relative motion include, without limitation, a threshold depth distance between objects relative to the total depth of the scene. As an illustrative example, consider the case of a scene comprising two objects of limited depth (for example, telephone poles) with a depth separation of two feet. Given the objects' limited depth, even small differences in distance between the two poles will produce clear, non-overlapping peaks in a depth-object histogram. Depending on their proximity to the vantage point, the modest depth separation between the two objects may or may not produce appreciable parallax movement in response to changes in perspective. For example, where the two telephone poles are at depths of 4 and 6 feet relative to the vantage point, changes in perspective are likely to produce appreciable parallax effects. However, when the same two telephone poles are situated at relatively greater distances to the vantage point, for example, at 30 and 32 feet from the vantage point, there is little to no appreciable parallax movement in response to small changes in perspective. In some embodiments according to this disclosure, determining an appropriate multi-layer model may include applying a distance-weighted separation criterion between the peaks of a depth-object histogram.

Additionally, where objects are separated to an extent that they exhibit perspective-dependent parallax effects, but the underlying objects are themselves small, it may be inefficient and unnecessary to create separate layer as such objects, by dint of their size, may only cause subtle or generally imperceptible changes in the appearance of the image with perspective, and thus do little to contribute to create the appearance of three-dimensionality.

Referring to the illustrative example of FIG. 8, a depth-object histogram 800 is shown in the figure. As shown in the figure, histogram 800 has three principal peaks, with the first peak having a first amplitude a1, the second peak having a second amplitude, a2 and a third peak having an amplitude a3. Further, as shown in FIG. 8, the peaks of histogram 800 are offset by distances d0-d3, which in this example, are approximately equivalent to each other. Looking only at the presence of clear peaks and troughs, would suggest a multi-layer model comprising four layers, marked in the figure as $1_1$ (foreground), $1_2$ (first intermediate layer), $1_3$ (second intermediate layer) and $1_4$ (background layer). However, considering depth weighting and object size indicates that equivalent parallax effects may be obtained with a less computationally expensive multi-layer model comprising only two layers.

In the illustrative example of FIG. 8, first distance do is of equivalent magnitude to second through fourth distances d1-d3. However, as discussed herein, the extent to which a given depth separation between objects in an image frame produces discernable parallax effects diminishes as the objects get further away from the vantage. Thus, in some embodiments, applying a depth-based weighting factor, the separation d2 and d3 between the second and third peaks and the background, while of equivalent size to distance d1, may be insufficient to justify creating separate layers for the objects creating the second and third peaks of histogram 800. Additionally, or alternatively, an amplitude threshold for creating layers of a multi-layer model may be applied, from which it is determined that, based on amplitudes a2 and a3, the objects creating these peaks do not occupy sufficient space in the image frame to meaningfully contribute to parallax-shift effects. Here, again, the multi-layer model may be simplified to collapse the layers $1_2$-$1_4$ into a single layer, with minimal effect on the apparent three-dimensionality of images projected based on the multi-layer model.

FIG. 9 illustrates operations of an example method 900 for generating a two-dimensional image with parallax shift effects providing the appearance of three-dimensional depth according to various embodiments of this disclosure.

Referring to the illustrative example of FIG. 9, at operation 905, a processor of a computing platform (for example device 100 in FIG. 1) generating a multi-layer model and reprojecting images according to the multi-layer model receives one or more frames of image data (for example, image data 401 in FIG. 4) of a real-world scene. In some embodiments, the real-world scene has at least one object with some depth relative to a vantage point and a background. According to various embodiments, each one or more frames of image data comprises a raster of image data. Additionally, in some embodiments, the processor also receives depth data of the real-world scene.

According to various embodiments, at operation 910, the processor detects layer information of the scene, otherwise known as determining an association between regions of image data representing three-dimensional objects with depth values relative to a vantage point. Depending on embodiments, the image data provided and the available image processing resources at the computing platform, operation 910 may be performed in one or more ways. For example, in some embodiments, depth information of a scene may be obtained by performing visual inertial simultaneous location and mapping using a plurality of frames of image data. In such embodiments, a disparity map between matching features of multiples images may be obtained, and depth values for objects obtained therefrom. In some embodiments, for example, where only a single frame of image data and no depth sensor information is obtained, the layer information of the scene may be obtained through object recognition and estimation based on template values for matched object types. For example, where an object in the image data is recognized as a motorcycle, the depth value of points on the motorcycle may be estimated from template values specifying the typical height (~4 feet) and length (~6 feet) of motorcycles. Alternatively or additionally, the apparatus obtaining the frames of image data also includes a depth sensor, and detecting the layer information comprises mapping the depth sensor data to the image data. Depending on embodiments, detecting the layer information of a scene may further comprise obtaining a quantitative representation of the distribution of pixels associated with objects relative to depth values (for example, histogram 800 in FIG. 8).

Referring to the illustrative example of FIG. 9, at operation 915, the processor determines a multi-layer model for the scene. According to some embodiments, determining a multi-layer model comprises setting one or more structural parameters of the model (for example, a ray connecting a vantage point with a vanishing point. Additionally, determining a multi-layer model may further comprise determining an optimum number of layers for multi-layer model, wherein an optimum number of layers best balances the need to provide discernable perspective-dependent parallax effects as well as minimizing computational load. Once the structural parameters of the multi-layer model (for example, the line along which depth is to be measured and the number of layers) have been determined, operation 915 further comprises setting depth values defining the boundaries of the foreground and background layers, and where specified by the multi-layer model, one or more intermediate layers.

According to various embodiments at operation 920, the processor maps pixels of image data to the constituent layers of the multi-layer model, building out the foreground, background, and where specified, intermediate layers for a first perspective. In some embodiments, operation 920 comprises reprojecting the pixels (for example, as described with reference to operation 605 in FIG. 6) and performing color texture mapping (for example, as described with reference to operation 610 in FIG. 6).

At operation 925, the processor renders the pixels, as mapped to a first vantage point, and as applied to the multi-layer model to generate a first image of the real-world scene, and displays same as a two-dimensional display provided through a device (for example, a smartphone or VR HMD). According to certain embodiments, subsequent to operation 925, an input associated with a shift in perspective from the first perspective to a second perspective is received, and operation 920 is repeated, with the pixels being mapped by applying the multi-layer model to the second perspective, and then rendered for display. By performing operations 925 and 930 in rapid succession (for example, in less than a fraction of a second), the content on the display of the device exhibits parallax effects which provide the appearance of three-dimensionality.

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

None of the description in this application should be read as implying that any particular element, step, or function is an essential element that must be included in the claim scope. The scope of patented subject matter is defined only by the claims. Moreover, none of the claims is intended to invoke 35 U.S.C. § 112 (f) unless the exact words "means for" are followed by a participle.

What is claimed is:

1. A method of generating a two-dimensional image with parallax shift effects providing an appearance of three-dimensional depth, the method comprising:
receiving, from a camera, one or more frames of image data of a scene comprising a background and one or more three-dimensional objects, wherein each frame of image data comprises a raster of pixels of image data;
detecting, based on the one or more frames of image data, layer information of the scene, wherein the layer information is associated with a depth-based distribution of the pixels of image data in the one or more frames of image data;
determining, based on the layer information of the scene, a multi-layer model for the scene, the multi-layer model comprising a plurality of discrete layers comprising a first discrete layer and a second discrete layer, wherein each discrete layer is associated with a unique depth value relative to the camera;

mapping the pixels of image data to the discrete layers of the plurality of discrete layers;

rendering the pixels of image data as a first image of the scene as viewed from a first perspective; and rendering the pixels of image data as a second image of the scene as viewed from a second perspective, the second image comprising a parallax shift effect of content in the first image based on repositioning the first discrete layer relative to the second discrete layer;

wherein one or more pixels of the first discrete layer occlude a first set of pixels of the second discrete layer in the first image;

wherein the one or more pixels of the first discrete layer occlude a second set of pixels of the second discrete layer in the second image; and wherein the first and second discrete layers of the multi-layer model are selected from a set of possible layers as satisfying depth and size criteria for providing the parallax shift effect.

2. The method of claim 1, wherein the one or more frames of image data comprise a single frame of image data obtained from a single camera perspective.

3. The method of claim 2, further comprising:
passing the single frame of image data to a machine model to reconstruct a depth map; and
detecting the layer information of the scene based on the reconstructed depth map.

4. The method of claim 1, further comprising:
detecting the one or more three-dimensional objects of the scene; and
determining the multi-layer model of the scene based on a depth-based distribution of the one or more detected three-dimensional objects of the scene.

5. The method of claim 4, wherein a number of discrete layers of the multi-layer model is based on a number of detected three-dimensional objects in the scene whose size exceeds a threshold size.

6. The method of claim 1, further comprising:
determining the depth-based distribution of the pixels of image data in the one or more frames of image data;
identifying peaks in the depth-based distribution of the pixels of image data exceeding an amplitude threshold value and a depth separation threshold value; and
creating one or more discrete layers of the multi-layer model based on the identified peaks exceeding the amplitude threshold value and the depth separation threshold value;
wherein the depth and size criteria for providing the parallax shift effect comprise the amplitude threshold value and the depth separation threshold value.

7. The method of claim 1, wherein the plurality of discrete layers comprises:
a foreground layer at a front of the scene;
a background layer at a back of the scene; and
one or more intermediate layers, wherein each of the one or more intermediate layers is associated with a unique depth value between a depth value of the foreground layer and a depth value of the background layer.

8. An apparatus for generating a two-dimensional image with parallax shift effects providing an appearance of three-dimensional depth, the apparatus comprising:
a camera; and
a controller configured to:
receive, from the camera, one or more frames of image data of a scene comprising a background and one or more three-dimensional objects, wherein each frame of image data comprises a raster of pixels of image data;

detect, based on the one or more frames of image data, layer information of the scene, wherein the layer information is associated with a depth-based distribution of the pixels of image data in the one or more frames of image data;

determine, based on the layer information of the scene, a multi-layer model for the scene, the multi-layer model comprising a plurality of discrete layers comprising a first discrete layer and a second discrete layer, wherein each discrete layer is associated with a unique depth value relative to the camera;

map the pixels of image data to the discrete layers of the plurality of discrete layers;

render the pixels of image data as a first image of the scene as viewed from a first perspective; and render the pixels of image data as a second image of the scene as viewed from a second perspective, the second image comprising a parallax shift effect of content in the first image based on repositioning the first discrete layer relative to the second discrete layer;

wherein one or more pixels of the first discrete layer occlude a first set of pixels of the second discrete layer in the first image;

wherein the one or more pixels of the first discrete layer occlude a second set of pixels of the second discrete layer in the second image; and wherein the first and second discrete layers of the multi-layer model are selected from a set of possible layers as satisfying depth and size criteria for providing the parallax shift effect.

9. The apparatus of claim 8, wherein the one or more frames of image data comprise a single frame of image data obtained from a single camera perspective.

10. The apparatus of claim 9, wherein the controller is further configured to:
pass the single frame of image data to a machine model to reconstruct a depth map; and
detect the layer information of the scene based on the reconstructed depth map.

11. The apparatus of claim 8, wherein the controller is further configured to:
detect the one or more three-dimensional objects of the scene; and
determine the multi-layer model of the scene based on a depth-based distribution of the one or more detected three-dimensional objects of the scene.

12. The apparatus of claim 11, wherein a number of discrete layers of the multi-layer model is based on a number of detected three-dimensional objects in the scene whose size exceeds a threshold size.

13. The apparatus of claim 8, wherein the controller is further configured to:
determine the depth-based distribution of the pixels of image data in the one or more frames of image data;
identify peaks in the depth-based distribution of the pixels of image data exceeding an amplitude threshold value and a depth separation threshold value; and
create one or more discrete layers of the multi-layer model based on the identified peaks exceeding the amplitude threshold value and the depth separation threshold value;

wherein the depth and size criteria for providing the parallax shift effect comprise the amplitude threshold value and the depth separation threshold value.

14. The apparatus of claim 8, wherein the plurality of discrete layers comprises:
   a foreground layer at a front of the scene;
   a background layer at a back of the scene; and
   one or more intermediate layers, wherein each of the one or more intermediate layers is associated with a unique depth value between a depth value of the foreground layer and a depth value of the background layer.

15. A non-transitory computer-readable medium comprising instructions that, when executed by a processor, cause an apparatus to:
   receive, from a camera, one or more frames of image data of a scene comprising a background and one or more three-dimensional objects, wherein each frame of image data comprises a raster of pixels of image data;
   detect, based on the one or more frames of image data, layer information of the scene, wherein the layer information is associated with a depth-based distribution of the pixels of image data in the one or more frames of image data;
   determine, based on the layer information of the scene, a multi-layer model for the scene, the multi-layer model comprising a plurality of discrete layers comprising a first discrete layer and a second discrete layer, wherein each discrete layer is associated with a unique depth value relative to the camera;
   map the pixels of image data to the discrete layers of the plurality of discrete layers;
   render the pixels of image data as a first image of the scene as viewed from a first perspective; and
   render the pixels of image data as a second image of the scene as viewed from a second perspective, the second image comprising a parallax shift effect of content in the first image based on repositioning the first discrete layer relative to the second discrete layer;
   wherein one or more pixels of the first discrete layer occlude a first set of pixels of the second discrete layer in the first image;
   wherein the one or more pixels of the first discrete layer occlude a second set of pixels of the second discrete layer in the second image; and
   wherein the first and second discrete layers of the multi-layer model are selected from a set of possible layers as satisfying depth and size criteria for providing the parallax shift effect.

16. The non-transitory computer-readable medium of claim 15, wherein the one or more frames of image data comprise a single frame of image data obtained from a single camera perspective.

17. The non-transitory computer-readable medium of claim 16, further comprising instructions that, when executed, cause the apparatus to:
   pass the single frame of image data to a machine model to reconstruct a depth map; and
   detect the layer information of the scene based on the reconstructed depth map.

18. The non-transitory computer-readable medium of claim 15, further comprising instructions that, when executed, cause the apparatus to:
   detect the one or more three-dimensional objects of the scene; and
   determine the multi-layer model of the scene based on a depth-based distribution of the one or more detected three-dimensional objects of the scene.

19. The non-transitory computer-readable medium of claim 18, wherein a number of discrete layers of the multi-layer model is based on a number of detected three-dimensional objects in the scene whose size exceeds a threshold size.

20. The non-transitory computer-readable medium of claim 15, further comprising instructions that, when executed, cause the apparatus to:
   determine the depth-based distribution of the pixels of image data in the one or more frames of image data;
   identify peaks in the depth-based distribution of the pixels of image data exceeding an amplitude threshold value and a depth separation threshold value; and
   create one or more discrete layers of the multi-layer model based on the identified peaks exceeding the amplitude threshold value and the depth separation threshold value;
   wherein the depth and size criteria for providing the parallax shift effect comprise the amplitude threshold value and the depth separation threshold value.

\* \* \* \* \*

UNITED STATES PATENT AND TRADEMARK OFFICE
CERTIFICATE OF CORRECTION

PATENT NO. : 12,198,247 B2
APPLICATION NO. : 17/806029
DATED : January 14, 2025
INVENTOR(S) : Xiong et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 106 days.

Signed and Sealed this
Sixth Day of May, 2025

Coke Morgan Stewart
*Acting Director of the United States Patent and Trademark Office*